(12) United States Patent
Musy et al.

(10) Patent No.: US 9,802,551 B2
(45) Date of Patent: Oct. 31, 2017

(54) METHOD FOR MANUFACTURING A VEHICLE INTERIOR TRIM PART AS WELL AS A VEHICLE INTERIOR TRIM PART

(71) Applicant: Faurecia Innenraum Systeme GmbH, Hagenbach (DE)

(72) Inventors: Maxime Musy, Karlsruhe (DE); Bruno Boretti, Traubach-le-Haut (FR); René Zemmrich, Betzdorf (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 22 days.

(21) Appl. No.: 14/698,943

(22) Filed: Apr. 29, 2015

(65) Prior Publication Data

US 2015/0307034 A1    Oct. 29, 2015

(30) Foreign Application Priority Data

Apr. 29, 2014  (DE) .................. 10 2014 208 073

(51) Int. Cl.
  *B60R 13/02*     (2006.01)
  *B32B 38/00*     (2006.01)
  (Continued)

(52) U.S. Cl.
  CPC .............. *B60R 13/02* (2013.01); *B29C 65/08* (2013.01); *B29C 65/7847* (2013.01);
  (Continued)

(58) Field of Classification Search
  CPC ....... B60R 13/02; B29C 66/69; B29C 66/532; B29C 66/81433; B29C 66/21;
  (Continued)

(56) References Cited

U.S. PATENT DOCUMENTS 6,214,157 B1 *  4/2001  Spengler ............... B29C 51/087
                                                                  156/304.1

FOREIGN PATENT DOCUMENTS

| AT | EP 2532502 A1 * | 12/2012 | ......... B29C 35/0261 |
| DE | EP 0569846 A2 * | 11/1993 | ............ B29C 51/14 |
| WO | WO-2013/150026 | 10/2013 | |

* cited by examiner

*Primary Examiner* — Joseph D Pape
*Assistant Examiner* — Dana Ivey
(74) *Attorney, Agent, or Firm* — Schwegman Lundberg & Woessner, P.A.

(57) ABSTRACT

The present subject matter relates to a method for manufacturing a vehicle interior trim part comprising a decor layer which forms a groove, as well as a decor element which is welded in the groove) of the decor layer, wherein the decor element is brought into the groove and is subsequently fixed in the groove by way of welding. According to the present subject matter, a welding head, e.g. an ultrasound sonotrode, is used for welding, and this comprises a contact side which is equipped with a plurality of projections which are arranged distanced to one another in a row and which taper to their contact surfaces, and wherein the welding head for producing the seam is pressed against a rear side of the decor layer in the region of the groove, in a manner such that the individual projections of the row of projections in a longitudinal directions of the groove come into contact with the rear side of the decor layer in a manner offset to one another, wherein the projections have a width which corresponds at least to 50% of a width of the decor element.

12 Claims, 3 Drawing Sheets

(51) Int. Cl.
  *B32B 37/14*   (2006.01)
  *B32B 37/18*   (2006.01)
  *B32B 37/06*   (2006.01)
  *B29C 65/08*   (2006.01)
  *B29C 65/78*   (2006.01)
  *B29C 65/00*   (2006.01)
  B29L 31/30    (2006.01)

(52) U.S. Cl.
  CPC ............ *B29C 66/21* (2013.01); *B29C 66/244* (2013.01); *B29C 66/532* (2013.01); *B29C 66/69* (2013.01); *B29C 66/81433* (2013.01); *B32B 37/06* (2013.01); *B32B 37/142* (2013.01); *B32B 37/182* (2013.01); *B32B 38/0008* (2013.01); *B29C 66/7392* (2013.01); *B29L 2031/3041* (2013.01); *B32B 2605/003* (2013.01)

(58) Field of Classification Search
  CPC ... B29C 66/244; B29C 66/7392; B29C 63/02; B29C 65/7847; B29C 65/08; B32B 37/142; B32B 37/06; B32B 37/182; B32B 38/0008; B32B 2605/003; B29L 2031/3041
  USPC ........................................................ 296/1.08
  See application file for complete search history.

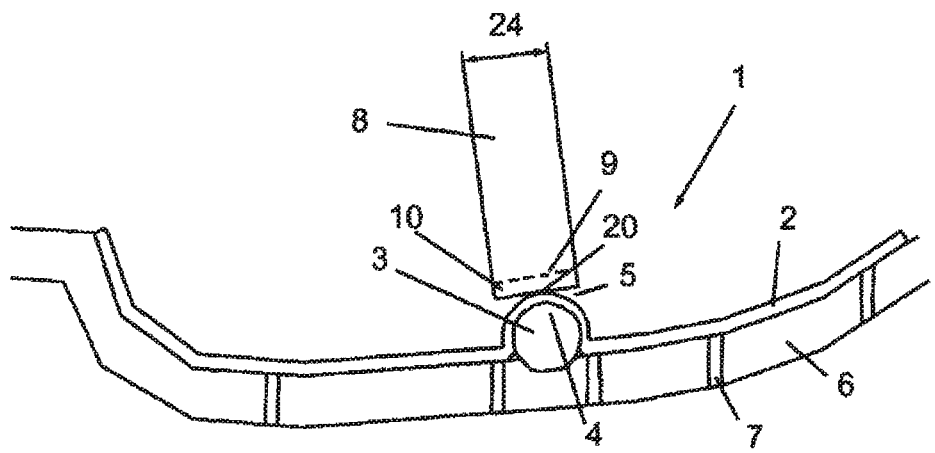
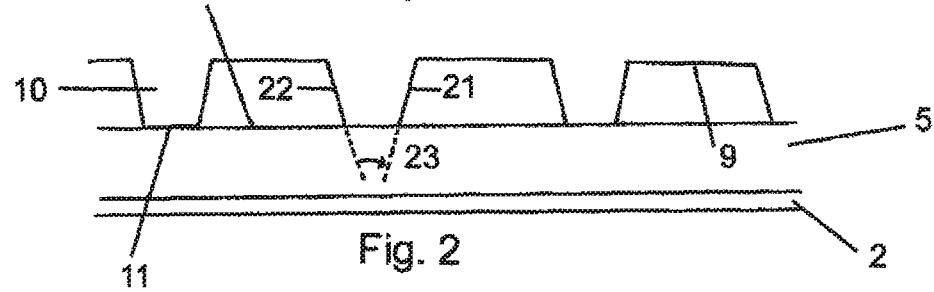
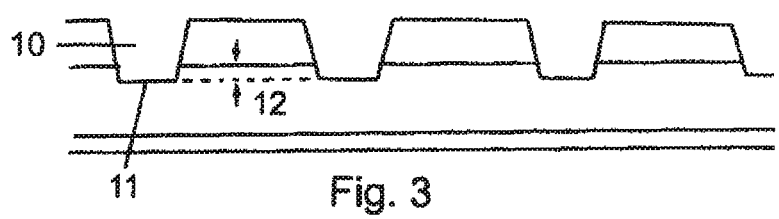
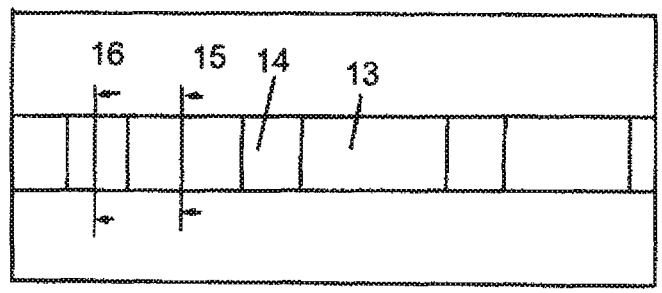

METHOD FOR MANUFACTURING A VEHICLE INTERIOR TRIM PART AS WELL AS A VEHICLE INTERIOR TRIM PART

CLAIM OF PRIORITY

This application claims the benefit of priority of German Patent Application No. DE 10 2014 208 073.8, filed on 29 Apr. 2014, the benefit of priority of which is claimed hereby, and which is incorporated by reference herein in its entirety.

TECHNICAL FIELD

The present subject matter relates to a method for manufacturing a vehicle interior trim part which comprises a decor layer with a groove, wherein a decor element is welded in the groove of the decor layer, as well as to a corresponding vehicle interior trim part.

BACKGROUND

For manufacturing such vehicle interior trim parts, see, e.g., WO 2013/150026, one approach can be to firstly introduce a decor element into a groove of a decor layer and subsequently to press an ultrasound sonotrode against the rear side of the decor layer, in the region of the groove and thus to incorporate an ultrasound weld seam connecting the decor element to the decor layer.

Several problems occur with certain approaches. On the one hand, the decor layer is relatively significantly weakened due to the incorporation of the ultrasound weld seam. This, with a mechanical loading of the decor layer can lead to damage occurring on this. A further problem is the fact that with vehicle interior trim parts manufactured according to methods from the state of the art, markings on the A-side occasionally occur and these originate from the incorporated ultrasound weld seam. The obtained connection between the decor element and the decor layer is moreover not reliably given with methods according to the state of the art, e.g., detachments of the decor element from the decor layer can occur.

SUMMARY

This document describes a method for manufacturing vehicle interior trim part, as well as a thus manufactured vehicle interior trim part, with which the problems mentioned above do not occur or only to a lesser extent.

In an example, certain advantages can be achieved by way of a welding head, e.g., a specially shaped welding head, e.g. an ultrasound sonotrode (also referred to as "horn"), being used. Any sort of welding device which is configured to weld a decor layer to a decor element may constitute a "welding head" with regard to the instant patent application. Welding may be achieved by use of ultrasound energy, e.g., as applied by an ultrasound sonotrode, which is shown in the non-limiting examples of this patent application. Further methods of welding involve the application of heat energy, electric energy and/or radiation energy. In the following, any mention of the term "welding" can include "ultrasound welding" but is not limited to that term; the same applies to terms as, for instance, "weld seam", "weld connection" etc.

The welding head comprises a contact side, e.g., a side which faces the workpiece during the welding and which is provided with a plurality of projections. The projections are arranged on one, preferably exactly one row. The projections in particular can all be arranged on a straight line. In particular, all projections can be distanced to their respective neighbouring projections in the same manner, e.g., adjacent projections are always distanced to one another by the same (with respect to length and direction) displacement vector. The projections each have a contact surface which is pressed against a rear side of the decor layer when incorporating a weld seam. The projections are positioned rigidly to one another, e.g., they are not displaceable to one another. The contact side of the welding head preferably does not come into contact with the prominence, between the projections. The projections are designed in a manner such that they taper to the contact surface.

With the method, the welding head, e.g. the ultrasound sonotrode, is pushed against the rear side of the decor layer in a manner such that the projections arranged in the row come into contact with a rear side of the decor layer in a longitudinal direction of the groove. The row of projections preferably at least over a part of its length can run parallel to a longitudinal direction of the groove. The projections have a width which corresponds to at least 50% of the width of the decor element.

Regions in which the decor layer and the decor element remain unchanged with regard to an initial condition before the welding remain between connection locations, in which a connection between the decor layer and the decor element was incorporated by way of welding, due to the fact that a plurality of contact surfaces or projections which are arranged distanced to one another is used. By way of this, it is ensured that only a low weakening of the decor layer occurs, since sufficiently large non-weakened regions remain between the weld locations produced by the individual projections, by way of which the mechanical characteristics of the decor layer are adequately retained.

Due to the tapering shape, it is possible to simultaneously achieve an adequately high energy (e.g. ultrasound) intensity, in order to effect a melting of the material of the decor layer, only very closely to the welding head (e.g. ultrasound sonotrode) and thus not in the region of the viewed side of the decor layer. A reliable positioning of the weld seam in the direction of the width of the groove is rendered possible by way of the width of the prominence of at least 50% of the width of the decor element. The weld connection is always produced at the lowest point of the groove by way of this, by which means the risk of markings arising on the viewed side of the decor layer is further reduced.

The decor layer can form a prominence which is directed to the rear side and which corresponds to a shape of the groove. A thickness of the decor layer which can lie for example between 0.5 and 2 mm, can for example be roughly constant in the region of the groove before the weld seam is incorporated (after the incorporation of the weld seam, the thickness of the decor layer is not essentially constant only where the material of the decor layer was melted by the welding energy). "Roughly constant" or "essentially constant" is to mean that the thickness in the framework of manufacturing inaccuracies only fluctuates for example by ±30%, preferably ±20% and particularly preferably ±10%. If the thickness of the decor layer is constant in the region of the groove, then the groove is achieved by way of the decor layer being bent into a U-shape in the region of the groove. The decor layer thus in the region of the groove forms a prominence which projects beyond the rear-side surface of the decor layer in the direction of the rear side, next to the groove.

If the welding head (e.g. the ultrasound sonotrode) is pressed against the prominence, one can ensure with little effort that the welding head is always pressed against the highest point of the prominence which corresponds to the lowest point of the groove, on account of the projections which are designed in a relatively wide manner (thus the projections which have a large extension in the direction transverse to the longitudinal direction of the groove). This is advantageous since a weld seam which is incorporated at this location is distanced as far as possible from the viewed side of the vehicle interior trim part, by which means one can particularly reliably ensure that no markings occur on the viewed side.

A correct pressing of the welding head onto a highest point of the prominence or the lowest point of the groove can be ensured in a particularly simple manner if the prominences each have a width which is at least 80%, preferably at least 100% and particularly preferably at least 150% or even at least 300% the width of the decor element and/or width of the prominence. At the same time, the welding head can have a width which is less than one hundredfold, preferably less that twentyfold, particularly preferably less than tenfold the width of the decor element. The spatial extension of the projections in the direction which runs to a longitudinal direction of the welding head, e.g. the ultrasound sonotrode, e.g., the direction, in which the projections are arranged offset to one another, and which runs orthogonally to a height directions, is indicated as the width of the projections. The width for example can be between 1 mm and 10 cm, preferably between 5 mm and 5 cm.

The projections can each have a front delimitation surface and a rear delimitation surface which they terminate in the longitudinal direction (e.g., in the direction of adjacent projections). The two delimitation surfaces can run at an angle between 0° and 90°, preferably between 0.5° and 20° and particularly preferably between 1° and 10° to one another. The angle, at which the two delimitation surfaces run to one another, indicates how greatly the prominences acutely taper to the contact surface and thus influences a distribution of the welding energy, e.g. the sound field, during the welding in the decor layer. It has been ascertained that by way of an angle lying in this range, one can reliably ensure that no markings occur on the A-side of the decor layer. By way of the shape of the prominences, one can particularly preferably succeed in an oscillation amplitude of the welding energy (e.g. ultrasound) on the viewed side of the decor element (thus the side of the decor element which is away from the decor layer) being already so low during the pressing of the welding head, e.g. ultrasound sonotrode, against the decor layer, that no visible damage to the decor element occurs. An amplitude of the (exemplary) ultrasound for example can be between 10 µm and 40 µm, preferably about 20 µm, directly at the ultrasound sonotrode. The welding energy can penetrate adequately deeply into the material, in order to also melt the surface of the decor element which faces the decor layer and thus to effect a reliable connection between the decor element and the decor layer.

In one variant of the method, the groove can run in an arcuate manner at least in regions. Despite this, welding with several projections can simultaneously take place over a section of the length of the prominence, due to the large width of the projections. The prominence is obliquely contacted by the projections at some locations, e.g., the width direction of the projections in these regions does not run orthogonally to the longitudinal direction of the groove, due to the arcuate course of the groove. However, due to the large width of the prominences, it continues to be ensured that the highest point of the prominence is hit (for example the region of the prominence which is arranged above the middle of the round cord, with a round cord as a decor element), so that the welding is produced at the lowest point of the groove. In contrast, with narrower projections however, the problem of the prominence only being hit at its edge, e.g., remote from its highest point could occur, so that the welding is not incorporated at the lowest point of the groove but close to the viewed side of the decor layer, wherein this could lead to undesirable visible markings.

The projections for example can have a length between 0.2 mm and 15 mm. Particularly preferably, the length can lie between 0.5 mm and 6 mm or between 1 mm and 3 mm. What is meant by this is the length of the projections at their foot, e.g., at their contact-side end which is away from the contact surface. The contact surfaces in contrast can be between 0.3 and 3 mm long. The projections for example can be distanced to one another by between 1 mm and 10 mm. The edge-to edge distance of adjacent projections is meant by this. A middle-to-middle distance of adjacent projections for example can be between 1.5 mm and 16 mm. The edge-to-edge distance of the projections for example can be between half and twenty fold, preferably one and tenfold, or double and fivefold the length of the projections. The projections can each have a height which for example can be between 0.5 mm and 10 mm and preferably between 1 mm and 6 mm.

A decor layer which is formed from a thermoplastic material can be applied for the method. The applied decor layer for example can have a thickness between 0.5 mm and 2 mm and a hardness degree between 50 Shore A and 90 Shore A. The decor element can also be formed from a thermoplastic material. The decor element can also have a hardness degree in the range specified above.

In subsequent method steps, the decor layer which is provided with the decor element can be connected to an intermediate layer and/or to a carrier. For example, a carrier consisting at least partly of plastic (for example a fibre-reinforced polypropylene carrier) can be provided, wherein the decor layer which is provided with the decor element, as well as the carrier can be applied into a rear-foaming mould, and wherein a foaming plastic material is introduced between the decor layer and the carrier, in order to thus connect the decor layer to the carrier.

The present subject matter, additionally to a method, also relates to a vehicle interior trim part which can be manufactured by way of the previously described method. The vehicle interior trim part comprises a decor layer having a groove, wherein the opening of the groove is directed to the viewed side of the vehicle interior trim part. The groove receives a decor element which is recognisable on viewing the viewed side. The decor layer in the region of the groove forms a prominence corresponding to the groove and facing a rear side of the vehicle interior trim part which is away from the viewed side. The prominence comprises a multitude of first and second regions which are arranged alternating in a longitudinal direction of the groove. The prominence in each case has a maximal height in the first regions. What is meant by this is the fact that the greatest height of the prominence in the first regions is defined in each case as the maximal height of the respective first region. The prominence in particular can be formed by way of the decor layer being bent in the shape of the groove. Accordingly, the maximal height can be equal to a maximal depth of the groove.

The second regions in each case comprise an indentation (notch) of the prominence, which delimits two adjacent first regions from one another. The height of the prominence in the second regions is reduced to a residual height which is smaller than the maximal height in the respectively adjacently arranged first regions. If one considers cross sections along a section plane running orthogonally to the longitudinal axis of the groove, in the first and second regions, then these differ to the extent that the height of the prominences within the cross sections through the second regions constantly corresponds to the maximal residual height, at least over a part of the width of the prominence. The height in the first regions is larger at least in regions. The indentation (notching) or reduction of the height in the second regions originates due to the fact that a welding was incorporated in these regions by way of the projections of the welding head, e.g. the ultrasound sonotrode, wherein the material of the decor layer was melted at least regionally.

Particularly preferably, the height of the prominence in the second regions can be equal to the maximal residual height over a section of the width of the prominence which corresponds precisely to the section of the width, in which the height of the prominence in the adjacent first regions is greater or equal to the maximal residual height. The height of the prominence in the second regions is thus reduced wherever it was previously greater than the residual height. A weld connection between the decor element and the decor layer is present in each case in the second regions, whereas no such weld connection is present in the first regions or whereas such a weld connection is only present at the edges which are adjacent the second regions. Particularly preferably, the prominence in the second regions in each case can have the maximal residual height in a single coherent region. This region can preferably be arranged centrally to the groove in the direction of the width.

A further embodiment of the method shows a welding head, for instance an ultrasound sonotrode (horn), wherein the teeth are inclined with regard to a longitudinal axis of the sonotrode. The inclination is for instance 5-30 degrees, preferably 10-20 degrees, most preferably 15 degrees.

A feeding unit which is used to move the welding head, for instance the sonotrode, with respect to the vehicle interior trim part to be produced is adapted to guarantee that the sliding direction corresponds to the teeth direction. By doing this, it is achieved that teeth structures can be provided in corners of the trim part to be produced, especially in tunnel-like parts/portions of the trim part to be produced. Thus, it is possible to produce a vehicle interior trim part in which even in corner areas indentations are made by the teeth of the welding head. Thus, three aspects are to be claimed by the indentation of the teeth: 1. a welding head/sonotrode according to the present subject matter which shows teeth that are angled/inclined with respect to the longitudinal axis of the welding head; 2. a method of production in which a feeding unit enables sliding of the welding head in the direction of the teeth; 3. an interior trim part which has indentations produced by the teeth which are placed in corner areas of especially hollow spaces of the interior trim part which are normally not achievable by teeth which are parallel to the longitudinal axis of the welding head.

The prominence in the environment of its highest point can be designed in a semicircular manner for example and in a manner such that the point of the semicircular shape which is arranged at the maximal height is arranged centrally to the groove. In the second regions, the shape of the prominence in the region of the middle of the groove or the prominence can be reduced to the maximal residual height, whereas the shape of the prominence in its outer regions, in which the height of the prominence is in any case smaller than the maximal residual height, can be identical in the first and second regions.

BRIEF DESCRIPTION OF THE DRAWINGS

Embodiment examples of the present subject matter are hereinafter explained in more detail by way of the figures. There are shown in:

FIG. 1 a sectioned view of one embodiment of a vehicle interior trim part during its manufacture, wherein the section view runs transversely to a decor element, FIG. 2 a lateral view of the vehicle interior trim part at a first point in time of a method for manufacturing the vehicle interior trim part, FIG. 3 a lateral view of the vehicle interior trim part, represented from the same perspective as represented in FIG. 2, but at a later point in time of the method, FIG. 4 a plan view of the rear side of one embodiment of a vehicle interior trim part, FIG. 5 a sectioned view through a first region of the vehicle interior trim part from FIG. 4, FIG. 6 a cross section through a second region of the vehicle interior trim part from FIG. 4, FIG. 7 a view onto the rear side of a further embodiment of a vehicle interior trim part before the welding of the decor element, FIG. 8 a view onto the rear side of the vehicle interior trim part of FIG. 7, during the welding of the decor element with a transparently represented welding head, here exemplified by an ultrasound sonotrode, FIG. 9 the vehicle interior trim part of FIG. 7, after the welding of the decor element, and FIGS. 10*a* to 10*c* an embodiment of a welding head, for instance an ultrasound sonotrode (horn). This sonotrode shows teeth which are inclined with regard to a longitudinal axis of the welding head. The example shows an inclination of 15 degrees.

DETAILED DESCRIPTION

Figure 5:
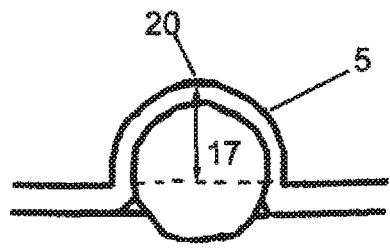

A vehicle interior trim part 1 is represented in FIG. 1, wherein the vehicle interior trim part 1 comprises a decor layer 2 as well as a decor element 3. The decor layer 2 in the region of the decor element 3 forms a groove 4, by way of the decor element which has an essentially constant thickness in the region of the groove 4 running in an arcuate manner. The decor layer 2 in the region of the groove 4 accordingly forms a prominence 5 which faces the rear side and which corresponds to the groove shape. The decor layer 2 and the decor element 3 are arranged on a tool 6 which comprises several openings 7, via which a vacuum can be applied onto the decor layer 2, in order to fix this on the tool 6. A welding head, e.g. an ultrasound sonotrode, 8 is pressed against the prominence 5, at the rear side, in order to form a weld connection between the decor layer 2 and the decor element 3, in the region of the prominence 5 or groove 4. Welding energy (e.g. ultrasound) is coupled into the decor layer 2 via the welding head/ultrasound sonotrode, in the region of the groove 4 for this.

The welding head/ultrasound sonotrode 8 comprises a contact side 9, from which projections 10 project, wherein these projections during the welding procedure come into contact with the prominence 5 by way of contact surfaces 11. This is to be recognised in FIGS. 2 and 3, which show a lateral view onto the vehicle interior trim part 1 and the welding head/ultrasound sonotrode 8. FIG. 2 hereby represents the vehicle interior trim part at a first point in time of the method, at which a weld connection does not yet exist between the decor layer 2 and the decor element 3, whereas FIG. 3 represents the vehicle interior trim part after the formation of a weld connection. In FIG. 2, the contact surfaces 11 of the welding head/ultrasound sonotrode 8 come into contact with the highest region 20 of the prominence 5. The material of the decor layer 2 and/or of the decor element 3 was regionally melted between the point in time, at which the vehicle interior trim part is represented in FIG. 2, and a point in time corresponding to the condition of the vehicle interior trim part in FIG. 3, wherein the welding head/ultrasound sonotrode was moved further in the direction of the tool 6. The welding head/ultrasound sonotrode by way of this has penetrated into the prominence 5 with a certain penetration depth 12, in the region of the projections 10. Weld connections were formed between the decor layer 2 and the decor element 3, by way of the melting of the material of the decor layer in the region of the prominence 5. The decor element 3 is not to be recognised in the lateral views of FIGS. 2 and 3 since it is covered by the material of the decor layer 2 which forms the prominence 5.

The shape of the welding head (e.g. the ultrasound sonotrode) and in particular of the projections 10 is to be recognised in detail in the FIGS. 2 and 3. The projections 10 each have a front delimitation surface 21 and a rear delimitation surface 22. The two delimitation surfaces run at an angle 23 of about 10° to one another. The projections are each about 2-3 mm long at the foot. The projections on the contact surface have a length of about 1.5 mm. The projections in this embodiment example are roughly 3 mm high. Adjacent projections from the outer edge to the outer edge are distanced to one another by 5 mm and from the middle to the middle by 7-8 mm to one another. A width 24 of the welding head/the ultrasound sonotrode 8 or of the prominences 10 is to be recognised in FIG. 1 and is about 120% of a width of the decor element 3.

Figure 6:
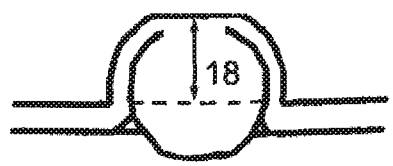

The vehicle interior trim part is represented in FIG. 4 in a plan view onto its rear side after the welding of the decor element 3 to the decor layer 2. As is to be recognised, the vehicle interior trim part 1 comprises first regions 13 and second regions 14. The second regions 14 correspond to the sections of the prominence 5, in which the contact surfaces 11 of the projections 10 have come into contact with the prominence 5. Accordingly, a weld connection between the decor layer 2 and the decor element 3 was formed in these regions. The first regions 13 in contrast correspond to the sections of the prominence 5 which have not come into contact with a contact surface 11, e.g., no weld connection between the decor element 3 and the decor layer 2 is present in these regions. Section lines 15 and 16 are represented in FIG. 4. The section line 15 runs through a first region 13, whereas the second section line 16 runs through a second region 14. The cross section of the vehicle interior trim part along the section line 15 is represented in FIG. 5. As is to be recognised by way of a comparison of the FIGS. 1 and 5, the cross section through the vehicle interior trim part 1 was not changed in the region of the section line 15 with the welding. The prominence 5 for this reason continues to have its initial maximal height 17. In contrast, it is to be recognised in the section along the section line 16 and which is represented in FIG. 6 that the height of the prominence 5 in the second regions 14 was reduced down to a residual height 18. The cross section of the vehicle interior trim part 1 was flatted everywhere where the prominence 5 was higher than the residual height 18 before incorporating the weld connection. The cross section is essentially unchanged, e.g., is identical as in FIG. 5, where the height of the prominence 5 was already previously lower than the residual height 18. One can moreover recognise in FIG. 6, that a border surface no longer exists between the decor element 3 and the decor layer 2, e.g., the materials are melted to one another, in the environment of an initially highest point of the prominence 5 or of a lowest point of the groove 4.

With the previously described vehicle interior trim part, the decor layer 2 for example can be formed from a thermoplastic polyurethane skin with a hardness degree of 70 Shore A. The decor element 3 for example can consist of a material which is essentially identical, wherein this however is differently coloured. The decor layer for example can have a thickness of about 1 mm, whereas the decor element for example can be designed as a round cord with a diameter of about 5 mm. The decor layer 2 and the decor element 3 can also be designed in the same manner in the subsequently described embodiment of FIGS. 7 and 9.

Figure 7:
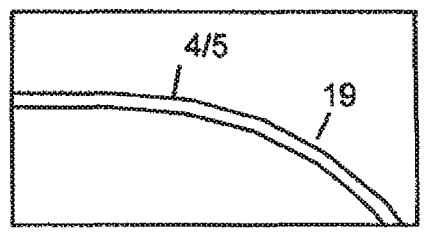
Figure 8:
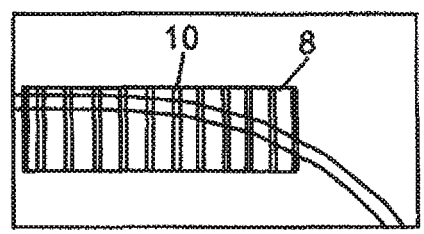
Figure 9:
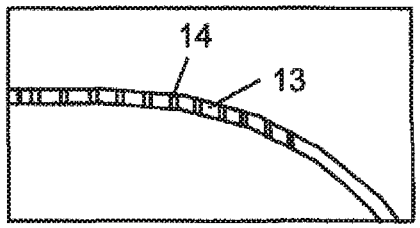

An alternative embodiment of a vehicle interior trim part is represented in FIGS. 7 to 9. This differs from the vehicle interior trim part from the FIGS. 1 to 6 essentially in that the groove 4 or prominence 5 runs arcuately in a region 19. Accordingly, the decor element 2 also runs arcuately in regions. As is to be recognised in FIG. 8, a welding head, for example an ultrasound sonotrode 8 with projections 10, is also brought into contact with the prominence 5 according to one method for manufacturing a vehicle interior trim part according to this embodiment. The welding head/ultrasound sonotrode 8 is represented transparently in FIG. 8, in a manner such that regarding the welding head/ultrasound sonotrode, only edges are represented and that edges of the vehicle interior trim part 1 which are actually covered by the welding head/ultrasound sonotrode are represented as if they were not covered. Weld connections which are distanced to one another are simultaneously produced over a relatively long section of the decor element 3, since the welding head/ultrasound sonotrode and its projections 10 have a width which corresponds to a multiple of the width of the groove 4, wherein the contact surfaces 11 of the projections 10 always come into contact with the highest region 20 of the prominence 5. If a narrower welding head/ultrasound sonotrode 8 were used, the arcuate course of the prominence could lead to the welding head/ultrasound sonotrode in regions not coming into contact against the highest region 20 of the prominence 5, but coming into contact with the prominence 5 laterally offset to the highest region 20. This, depending on the control of the penetration depth 12, would lead to either an insufficiently stable weld connection being produced, or the production of the weld connection leads to markings on the A-side of the decor layer 2. Thus a reliable incorporation of a weld seam at the deepest point of the groove 4 is rendered possible even with an arcuate course of the groove 4 or of the decor element 3, by way of the wide design of the projections 10. The finished vehicle interior trim part after incorporating the weld seam (e.g. an ultrasound weld seam) is represented in FIG. 9. Some second regions 14 run as indentations arranged perpendicularly to a longitudinal direction of the groove 4. The indentations which have been incorporated by way of the projections 10 are arranged in an arcuately running region 19 of the groove at angles to a longitudinal direction of the groove 4, due to the arcuate course of the groove 4.

Figure 10A:
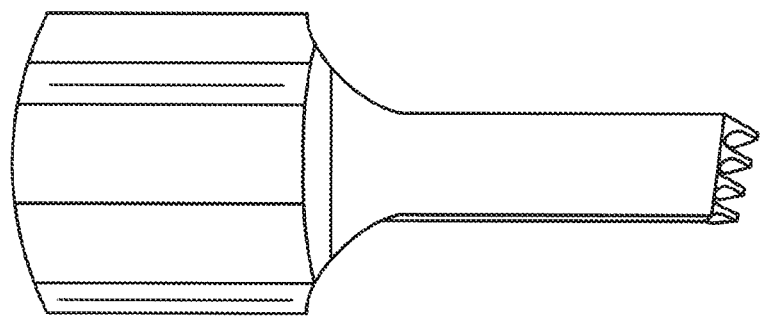

FIG. 10a shows a sonotrode (horn) developed to reach an area which is difficult to access.

Figure 10B:
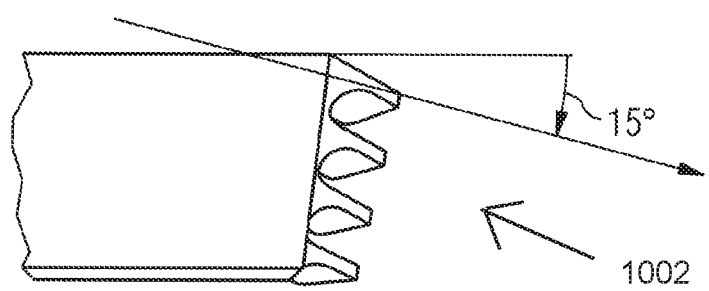

FIG. 10b shows a detail of the welding head/sonotrode showing the inclination/angle of 15 degrees of the teeth 1002 as well as the moving direction of the cylinder. Not shown in this picture is a feeding unit which is adapted to guarantee that the sliding direction corresponds to the teeth direction.

Figure 10C:
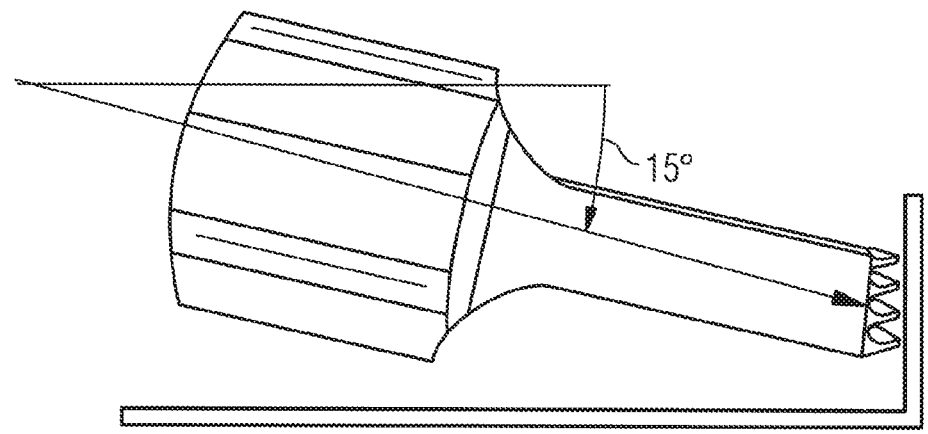

As shown in FIG. 10c, this specific welding head/horn allows to reach some corners of interior trim parts. FIG. 10c schematically shows a corner area of an interior trim part which would not be reached with the standard version of a welding head in which the teeth are angled at 0° with respect to the longitudinal axis of the welding head/sonotrode.

What is claimed is:

1. A method for manufacturing a vehicle interior trim part, the method comprising:
    a decor layer having a front side and a rear side opposed to the front side, wherein the decor layer forms a groove on the front side of the decor layer, and a decor element welded in the groove of the decor layer, wherein the decor element is brought into the groove and subsequently fixed in the groove by way of welding, wherein a welding head is used for the welding, wherein the welding head comprises a contact side with a plurality of projections that are arranged distanced to one another in a row and that taper towards contact surfaces, wherein the welding head for producing a weld seam is pressed against the rear side of the decor layer in the region of the groove in a manner such that the projections in a longitudinal direction of the groove come into contact with the rear side of the decor layer, and wherein the projections have a width that corresponds to at least 50% of a width of the decor element.

2. The method according to claim 1, wherein the decor layer forms a prominence that protrudes from the rear side of the decor layer toward a rear side of the vehicle interior trim part and that corresponds to the groove.

3. The method according to claim 1, wherein the projections of the applied welding head have a width of at least 80% of the width of the decor element and/or of a width of a prominence corresponding to the groove and directed to the rear side of the vehicle interior trim part.

4. The method according to claim 1, wherein the projections comprise front and rear delimitation surfaces that run at an angle between 0° and 90° to one another.

5. The method according to claim 1, wherein the groove at least in regions runs in an arcuate manner, wherein the projections of the welding head are arranged in a line, so that at least some adjacent projections come into contact with the rear side of the decor layer at a different angle to the groove.

6. The method according to claim 1, wherein the projections have a length between 0.2 mm and 15 mm.

7. The method according to claim 1, wherein the welding head is an ultrasound sonotrode and/or any other device for supplying ultrasound energy, heat energy, electric energy or radiation energy.

8. The method according to claim 1, wherein the welding head includes teeth that are inclined with regard to a longitudinal axis of the welding head at an angle of 5-30°.

9. A vehicle interior trim part, the vehicle trim part comprising:
    a decor layer having a front side and a rear side opposed to the front side; and
    a decor element, wherein the decor layer comprises a groove located on the front side of the decor layer and having an opening that is directed to a viewed side of the vehicle interior trim part and that receives the decor element, wherein the decor layer in the region of the groove forms a prominence protruding from the rear side of the layer toward a rear side of the vehicle interior trim part that is away from the viewed side, and corresponding to the groove, wherein the prominence comprises a multitude of first and second regions that are arranged in an alternating manner in a longitudinal direction, wherein the prominence in the first regions in each case has a maximal height, and the second regions comprise indentation of the prominence that are arranged between the first regions, wherein the prominence in cross sections through a second region with a section plane running orthogonally to the longitudinal direction has a maximal residual height which is smaller than the maximal height in adjacent first regions, and wherein the height of the prominence in the cross sections through a second region which have a section plane) running orthogonally to the longitudinal direction, at least over a part of the width of the prominence constantly corresponds to the maximal residual height.

10. The vehicle interior trim part according to claim 9, wherein, in the cross sections through a second region, the prominence has the maximal residual height over a section of the cross section that corresponds to a section of the cross section, in which the prominence in the adjacent first regions has a height exceeding the residual height or a height corresponding to the residual height.

11. The vehicle interior trim part according to claim 9, wherein the height of the prominence in the cross sections in each case in exactly one single coherent section of the cross section of the prominence constantly corresponds to the maximal residual height.

12. The vehicle interior trim part according to claim 9, wherein the section of the cross section, in which the height of the prominence corresponds constantly to the maximal residual height is arranged centrally in the direction of the width.

* * * * *